J. F. CLEMENT.
PNEUMATIC TOOL.
APPLICATION FILED OCT. 14, 1914.
Reissued Nov. 17, 1914. 13,826.
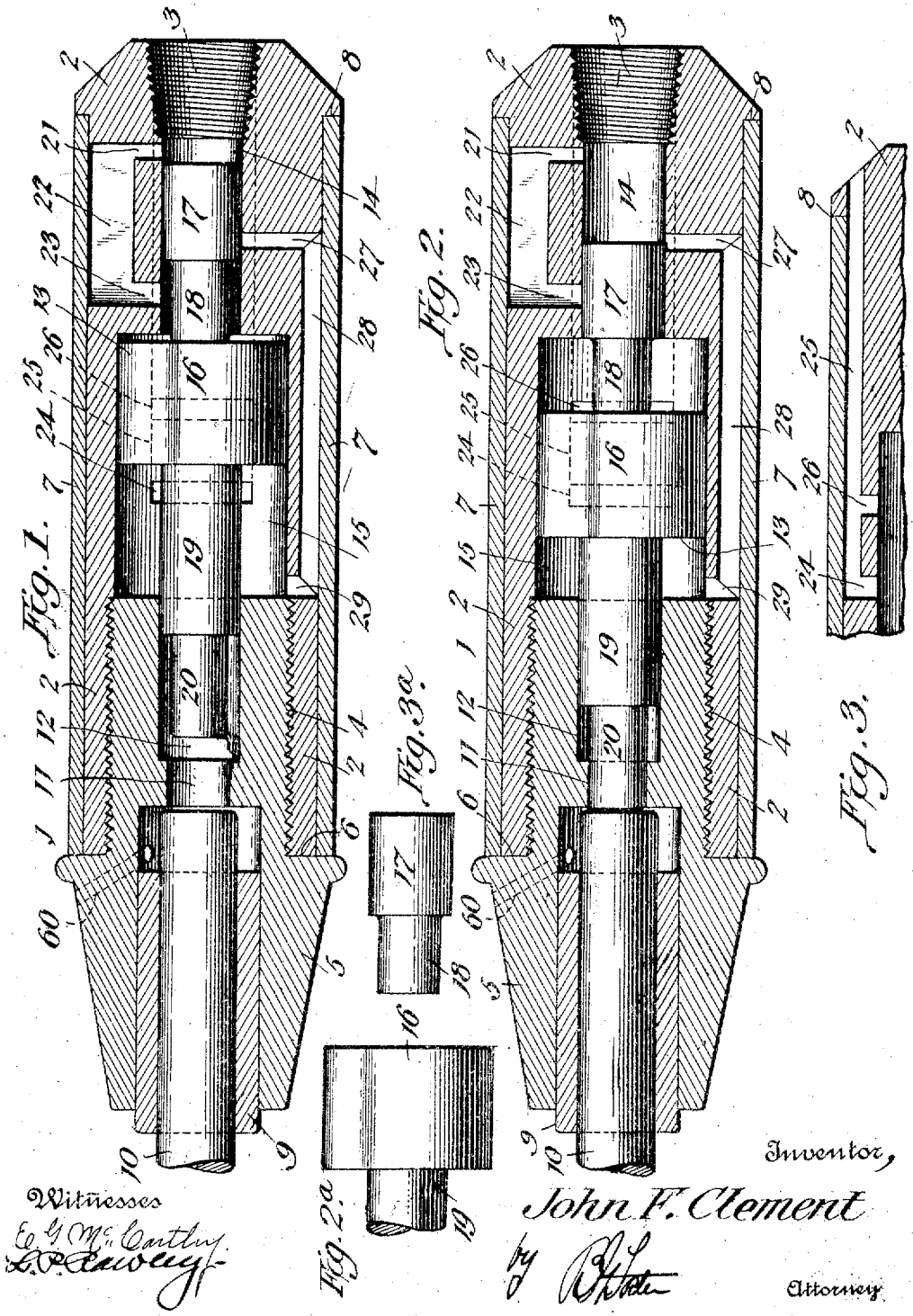

UNITED STATES PATENT OFFICE.

JOHN F. CLEMENT, OF PHILADELPHIA, PENNSYLVANIA, ASSIGNOR, BY MESNE ASSIGNMENTS, TO THE DENVER ROCK DRILL MANUFACTURING COMPANY, OF DENVER, COLORADO, A CORPORATION OF DELAWARE.

PNEUMATIC TOOL.

13,826. Specification of Reissued Letters Patent. Reissued Nov. 17, 1914.

Original No. 805,633, dated November 28, 1905, Serial No. 242,523. Application for reissue filed October 14, 1914. Serial No. 866,707.

*To all whom it may concern:*

Be it known that I, JOHN F. CLEMENT, a citizen of the United States, residing in the city and county of Philadelphia, State of Pennsylvania, have invented a new and useful Pneumatic Tool, of which the following is a specification.

My invention consists of a novel construction of a valveless pneumatic hand-tool adapted for general use in all cases where a hammer, mallet, or chisel are ordinarily employed, but particularly adapted for stone-work, provision being made for reducing and simplifying the number of parts and greatly cheapening the cost of construction.

It further consists of novel features of construction, all as will be hereinafter fully set forth.

Figure 1 represents a longitudinal sectional view of a pneumatic tool embodying my invention. Fig. 2 represents a longitudinal sectional view similar to Fig. 1, but showing the hammering-piston in different relation to the parts. Figs. $2^a$ and $3^a$ represent a modification of the piston. Fig. 3 represents a sectional view of a portion of the tool or cylinder, showing the exhaust-ports.

Similar numerals of reference indicate corresponding parts in the figures.

Referring to the drawings, 1 designates a pneumatic tool consisting of a casing 2 having its inlet end 3 threaded for connection with the hose supplying the motive fluid and its outer end internally threaded at 4, adapting the same to receive a nose-piece 5, which is also threaded and has a shoulder 6, which contacts with the casing 2, and an outer sleeve or cylinder 7, fitted on said casing. The sleeve is held in position between the shoulders 6 and 8. In the nose-piece 5 is fitted the chisel-bushing 9, adapted to receive the shank 10 of the working tool. Openings of different diameters, as 11 and 12, permit the striker of the piston 13 to impact against the shank 10 of the chisel. The casing 2 has the bores of different diameters 14 and 15. The piston 13, as shown, is a free piston that delivers hammer blows against the tool, and consists of the enlarged portion or body 16, to which at one end is secured the head 17 by means of the neck 18. From the enlarged portion 16 projects the extension 19, which terminates in the striker 20. The head 17 is adapted to reciprocate within the bore 14, while the enlarged portion 16 is adapted to reciprocate within the bore 15, and the extension 19 and striker 20 of the piston are adapted to move, respectively, within the bores 12 and 11 of the nose-piece 5. In the present instance I have shown the portions 17 and 19 of the piston as being of the same size in order that the piston 13 may be more easily fitted within the tool.

The motive fluid enters through inlet 3, and the piston being in the position seen in Fig. 1 will force the piston to the left, and the port 21 being open the motive fluid will pass therethrough into passage 22 and through the port 23 around the neck 18 and act on the body 16 to force the piston forward. The motive fluid in front of the piston will at the same time exhaust through port 24 into passage 25, the port 26, which opens into the exhaust-passage 25, being closed by the body 16. When the piston 13 advances, the head 17 of the same will close the port 23 and open the port 27, and the piston being now at or near its extreme forward position, as seen in Fig. 2, the motive fluid is permitted to pass through the port 27 into passage 28 and through the port 29 to the front of the body 16 and forces the piston backwardly to the position seen in Fig. 1, the air behind the body 16 exhausting at the same time through port 26 and passage 25 into the atmosphere.

It will be seen that in my invention I employ a differential piston consisting of a plurality of heads joined by a neck and that I preferably construct the top portion of the tool of an inner casing within which the piston reciprocates, said casing being contained within the outer sleeve or cylinder. In the construction seen in Figs. 1 and 2, it will be apparent that the air-pressure acting upon the head 17 initially serves to move the piston forwardly and that the forward impulse of the piston is greatly augmented by the additional supply of motive fluid which is conducted to the rear face of the head 16, so that a very powerful blow is struck by the piston at the termination of its forward stroke. It will be apparent that while I have shown the nose-piece 5 and the casing 2 in the construction seen in Figs. 1 and 2, as being in threaded engagement, if desired I may secure the same in assembled position by other means without departing from the spirit of my invention, and it will also be apparent that slight changes may be made in the proportion of the ports and passages and of the heads and areas of the piston seen in Figs. 1 and 2 without departing from the spirit of my invention, and I do not, therefore, desire to be limited in every instance to the exact construction herein shown and described.

In Figs. 1 and 2 it will be apparent that the cylinder, casing, and inlet-piece may be made integral without departing from the spirit of my invention and that, if desired, I may make slight changes in the location and arrangement of the ports and passages and in the proportion of the heads or areas of the differential piston employed and still be within the scope of my invention.

It will be apparent that, as shown in Figs. $2^a$ and $3^a$, the piston is divided into two parts and that the constant pressure of the motive fluid on the head 17 will keep the neck 18 pressed against the enlarged portion or body 16.

Having thus described my invention, what I claim as new, and desire to secure by Letters Patent, is:

1. In a pneumatic tool, a casing, a free hammer piston therein, said piston having an enlarged head, a smaller head at the rear of said enlarged head, a neck adjacent to said smaller head and of less diameter than said smaller head, said neck permitting the admission of motive fluid to the piston to force the same forwardly, and said smaller head controlling such admission, said smaller head always having constant pressure thereon and controlling the admission of motive fluid to return the piston, and said enlarged head controlling the exhaust of the motive fluid.

2. In a tool of the character described, a casing, a nose-piece, differential bores in said casing and said nose-piece, a differential free hammer piston reciprocating within said bores, a head on said piston at all times exposed to constant pressure, an enlarged head on said piston, an air passage controlled by said first-mentioned head for permitting the motive fluid to act against said enlarged head at the beginning of the stroke, means for permitting intermittent pressure against a face of said piston and exhaust ports and passages alternately opened and closed by said piston.

3. In a pneumatic tool, a casing, a nose piece, a differential free hammer piston within said casing, a reduced head on the rear of said piston always exposed to constant pressure for controlling the admission of motive fluid to both faces of the larger area of said piston and exhaust ports and passages controlled by the reciprocation of said larger area of said piston.

4. In a pneumatic tool, a casing, a free hammer piston therein, an enlarged head on said piston, a smaller head at the rear of said enlarged head and exposed at all times to constant pressure, a neck of less diameter than said smaller head and located between said heads, an air-passage always open to live air and controlled by said smaller head for permitting the live air to initially act on said enlarged head at the beginning of the stroke, exhaust ports and passages alternately opened and closed by said enlarged head, and ports and passages controlled by said smaller head for permitting the motive fluid to return the piston.

5. In a pneumatic tool, a casing, a free hammer piston therein, an enlarged head on said piston, a smaller head at all times exposed to constant pressure and located at the rear of said enlarged head, an extension for said smaller head of less diameter than the latter and permitting the admission of motive fluid to said enlarged head at the beginning of the stroke, said smaller head controlling the admission of motive fluid to return the piston, and exhaust ports and passages alternately opened and closed by said larger piston.

6. In a pneumatic tool, a casing, a free hammer piston therein, an enlarged head 16 thereon, a smaller head 17 at the rear end of said enlarged head, a neck 18 between said heads and of less diameter than said smaller head, an air passage 21, 22, 23 always open to the motive fluid controlled by said small head for permitting motive fluid to act on the enlarged head 16 at the beginning of the stroke, and air passages 27, 28, 29 for permitting motive fluid to act on said enlarged head at the end of the stroke and controlled by said smaller head, and exhaust ports and passages alternately opened and closed by said piston.

7. In a pneumatic tool, a casing, a nose-piece at one end thereof, and having bores of different diameter therein, a free hammer piston having an enlarged portion 16, an extension 19 and a striker 20, each of the latter moving in said bores, a smaller head located at the rear of said piston, and a neck of less diameter than said head projecting forwardly thereof, said smaller head having constant pressure thereon, and said neck permitting motive fluid to act initially upon said enlarged portion of the piston to accelerate its forward movement.

In testimony whereof, I have hereunto set my hand in presence of two subscribing witnesses.

JOHN F. CLEMENT.

Witnesses:
H. M. LAFFERTY,
C. D. McVAY.